O. BÜHRING.
APPARATUS FOR THE SEPARATION OF LIQUIDS FROM GASES OR VAPORS.
APPLICATION FILED SEPT. 12, 1910.
981,058.
Patented Jan. 10, 1911.
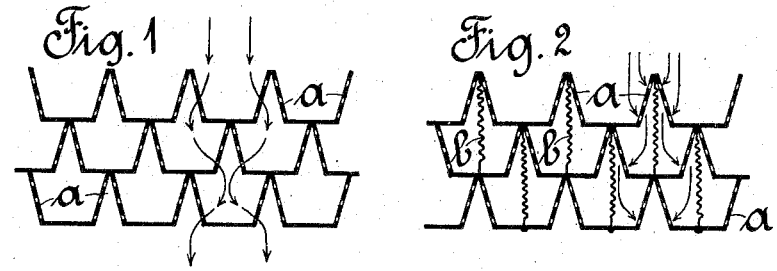
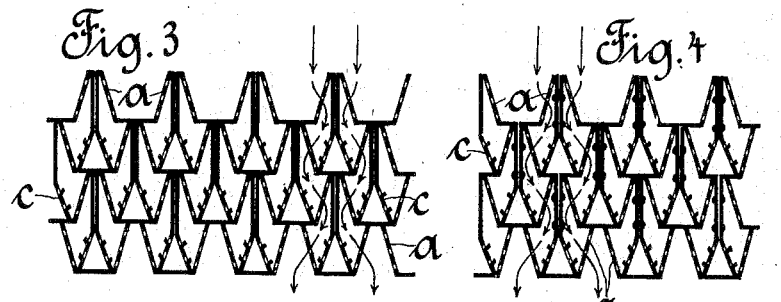
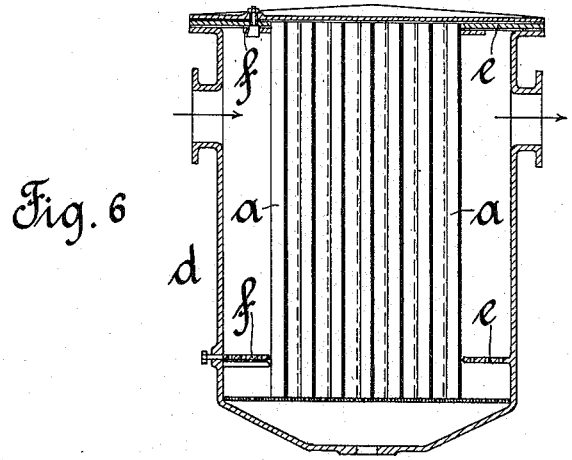
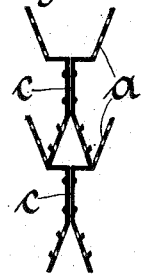
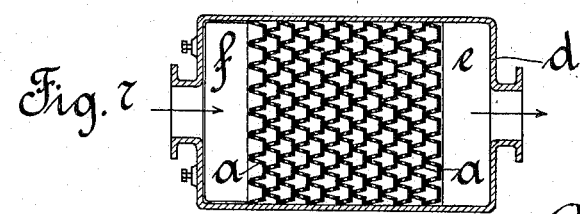
Witnesses:
Inventor:
Otto Bühring
by B. Singer,
Att'y.

UNITED STATES PATENT OFFICE.

OTTO BÜHRING, OF MANNHEIM, GERMANY.

APPARATUS FOR THE SEPARATION OF LIQUIDS FROM GASES OR VAPORS.

981,058. Specification of Letters Patent. Patented Jan. 10, 1911.

Application filed September 12, 1910. Serial No. 581,529.

*To all whom it may concern:*

Be it known that I, OTTO BÜHRING, engineer, a subject of the German Emperor, residing at Mannheim, in the Grand Duchy of Baden and Empire of Germany, have invented certain new and useful Improvements in Apparatus for the Separation of Liquids from Gases or Vapors, of which the following is a specification.

This invention relates to apparatus for the separation of liquids from gases or vapors such for example as the separation of oil from exhaust steam.

This apparatus consists of a number of rods or rails of channel section the walls of which are partly perforated and which are mounted in such manner in a casing, through which the gas or vapor passes, that the gas or vapor must pass through the perforated walls of the rods and the liquid contained therein is separated therefrom and runs down the rods or rails.

In the known liquid separators of this type it was necessary that the rods for the purpose of obtaining the required distance between two neighboring rods to permit of the passage of the gas or vapor, should be either separately secured to the top and bottom or secured in series to stationary perforated transverse walls. According to this invention however the rods are of such cross section that they can be loosely mounted in rows side by side and behind one another and hold each other in position, at the same time providing the necessary distance between two neighboring rods for the passage of the gas or vapor. No special securing means are therefore necessary, besides this the rods can be easily and rapidly withdrawn and replaced at any time.

In the accompanying drawing are illustrated some constructional forms of the invention.

Figures 1 to 4 show in section a series of rods. Fig. 5 shows two separate rods of the type illustrated in Fig. 4 also in section, and Figs. 6 and 7 show a casing in vertical and horizontal section, provided with the rods according to Fig. 1.

In all these constructions the rods $a$ of channel section are loosely mounted in rows side by side and behind one another in such manner that the inclined perforated lateral walls of two neighboring rods of a transverse row abut at their forward ends against one another and against the not perforated rear wall of a rod of the next front row. In this manner the rods hold each other rigidly in position; between their lateral walls however there is sufficient space for the passage of the gas or vapor. As shown by the arrows, the gas or vapor passes in a zigzag or serpentine path alternately through the one wall of one rod and through the other wall of the next rod. To insure this manner of the gas or vapor passage, in which both the lateral walls of all the rods are in action, the space between two rods of one row and the rod behind of the next row is divided by a partition $b$, as shown in Fig. 2, which partition reaches from the abutting front edges of the lateral walls of the two front rods to the center of the rear wall of the rod behind. These partitions may be flat or corrugated as shown. Instead of such a partition two inclined walls $c$ as shown in Fig. 3 could be employed, which are partly perforated and immediately behind the perforations are provided with inclined, forwardly directed projections. On its passage from one rod to another the gas or vapor must move along these partitions; in this manner the liquid contained therein is collected by the projections and forced through the holes, so that it runs down the rear side of the partitions.

According to the construction illustrated in Figs. 4 and 5 one half of each rod $a$ is united with one of the partitions $c$ immediately behind it to a single rail and each two of these rails are riveted together. By means of this construction of rods and partitions, the connecting together and removal thereof is simplified, and as it is unnecessary that the partitions $c$ should fit exactly between the rods $a$ but according to choice may be shorter or longer, the rods and partitions can be more easily fitted together and separated and further the manufacture thereof is simplified as this no longer depends upon the length of the partitions.

As shown in Figs. 6 and 7 the rods $a$ (as eventually also the partitions $c$) are placed into the casing $d$ in the manner hereinbefore described. The rods of the rear row rest at the top and bottom against stationary transverse rails $e$ and those of the front row also against transverse rails $f$ which rails, however, may be moved backward and forward for the purpose of firmly pressing together the rods after they have been placed in position and for loosening the same to permit of their removal. When pressing together the rods they are also pressed against the lateral walls of the casing in that each rod in consequence of its shape, is slightly expanded in a lateral direction; ribs on the lateral walls of the casing or other packing means can therefore be dispensed with. The gases or vapors may also flow in an opposite direction to that indicated by the arrows.

What I claim and desire to secure by Letters Patent is:—

1. In an apparatus for the separation of liquids from gases or vapors a number of rods or rails of channel section with perforated lateral walls, said rods or rails being loosely mounted in rows side by side and behind one another and being of such a section that they hold each other in position with the necessary distance between two neighboring rods or rails for the passage of the gas or vapor.

2. In an apparatus for the separation of liquids from gases or vapors a number of rods or rails of channel section with perforated lateral walls, said rods or rails being loosely mounted in rows side by side and behind one another and being of such a section that they hold each other in position with the necessary distance between two neighboring rods or rails for the passage of the gas or vapor, and the walls of the rods being on both sides inclined forward so that when pressing the rods together in the direction of the flow of the gas or vapor each rod slightly expands in a lateral direction and thus the rods are pressed against the lateral walls of the casing.

3. In an apparatus for the separation of liquids from gases or vapors a number of rods or rails of channel section with perforated lateral walls, said rods or rails being loosely mounted in rows side by side and behind one another and being of such a section that they hold each other in position with the necessary distance between two neighboring rods or rails for the passage of the gas or vapor, and between each two rods of one row and the rod behind of the next row two inclined, partly perforated partitions with lateral projections being provided along which partitions the gas or vapor must move.

4. In an apparatus for the separation of liquids from gases or vapors a number of rods or rails of channel section with perforated lateral walls, said rods or rails being loosely mounted in rows side by side and behind one another and being of such a section that they hold each other in position with the necessary distance between two neighboring rods or rails for the passage of the gas or vapor, and between each two rods of one row and the rod behind of the next row two inclined, partly perforated partitions with lateral projections being provided along which partitions the gas or vapor must move, wherein one half of each rod is integral with one of the partitions immediately behind the same, and each two neighboring rods or rails being connected together.

In testimony whereof I have affixed my signature in presence of two witnesses.

OTTO BÜHRING.

Witnesses:
ERNEST L. IVES,
JOSEF PFEIFFER.